United States Patent
Valencia et al.

(10) Patent No.: US 10,365,037 B2
(45) Date of Patent: Jul. 30, 2019

(54) HEATING COMPONENT TO REDUCE SOLIDIFICATION IN A CRYOGENIC DISTILLATION SYSTEM

(71) Applicants: Jaime A. Valencia, Houston, TX (US); Ransdall K. Smith, Spring, TX (US); E. Lawrence Kimble, Sugar Land, TX (US); Scott D. Kelman, Houston, TX (US)

(72) Inventors: Jaime A. Valencia, Houston, TX (US); Ransdall K. Smith, Spring, TX (US); E. Lawrence Kimble, Sugar Land, TX (US); Scott D. Kelman, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 395 days.

(21) Appl. No.: 15/197,810

(22) Filed: Jun. 30, 2016

(65) Prior Publication Data
US 2017/0082357 A1 Mar. 23, 2017

Related U.S. Application Data

(60) Provisional application No. 62/220,269, filed on Sep. 18, 2015.

(51) Int. Cl.
*F25J 3/00* (2006.01)
*F25J 3/02* (2006.01)

(52) U.S. Cl.
CPC ........... *F25J 3/0209* (2013.01); *F25J 3/0233* (2013.01); *F25J 3/0266* (2013.01); *F25J 3/0295* (2013.01);
(Continued)

(58) Field of Classification Search
CPC ........ Y02C 10/12; F25J 3/0209; F25J 3/0233; F25J 3/0266; F25J 3/0295; F25J 3/061;
(Continued)

(56) References Cited

U.S. PATENT DOCUMENTS 2,621,216 A 12/1952 White
2,843,219 A 7/1958 Habgood
(Continued)

FOREIGN PATENT DOCUMENTS

DE 3 149 847 7/1983
EP 0 133 208 2/1985
(Continued)

OTHER PUBLICATIONS

Aaron, D. et al. (2005) "Separation of $CO_2$ from Flue Gas: A Review," *Separation Science and Technology*, 40, pp. 321-348.
(Continued)

*Primary Examiner* — Keith M Raymond
(74) *Attorney, Agent, or Firm* — ExxonMobil Upstream Research Company—Law Department

(57) ABSTRACT

A method and a system for feeding a feed gas including methane ($CH_4$) and carbon dioxide ($CO_2$) to a cryogenic distillation column are provided herein. The method includes flowing a freeze zone $CO_2$ vapor stream into a freezing section of the column to produce an overhead stream that exits the column. The method includes heating the overhead stream via a heating component to reduce or prevent solidification of the $CO_2$ in the overhead stream.

10 Claims, 8 Drawing Sheets

(52) U.S. Cl.
CPC ........ *F25J 2200/02* (2013.01); *F25J 2200/74* (2013.01); *F25J 2200/76* (2013.01); *F25J 2205/20* (2013.01); *F25J 2280/10* (2013.01); *F25J 2280/40* (2013.01); *Y02C 10/12* (2013.01)

(58) Field of Classification Search
CPC ........ F25J 3/067; F25J 3/0635; F25J 2280/40; F25J 2280/10; F25J 2205/20; F25J 2200/02
See application file for complete search history.

(56) References Cited

U.S. PATENT DOCUMENTS

| | | |
|---|---|---|
| 2,863,527 A | 12/1958 | Herbert et al. |
| 2,960,837 A | 11/1960 | Swenson et al. |
| 3,050,950 A | 8/1962 | Karwat et al. |
| 3,109,726 A | 11/1963 | Karwat |
| 3,349,571 A | 10/1967 | Nebgen |
| 3,393,527 A | 7/1968 | Swenson et al. |
| 3,400,512 A | 9/1968 | McKay |
| 3,421,984 A | 1/1969 | Jensen et al. |
| 3,683,634 A | 8/1972 | Streich |
| 3,705,625 A | 12/1972 | Whitten et al. |
| 3,767,766 A | 10/1973 | Tjoa et al. |
| 3,824,080 A | 7/1974 | Smith et al. |
| 3,842,615 A | 10/1974 | Reigel et al. |
| 3,848,427 A | 11/1974 | Loofbourow |
| 3,895,101 A | 7/1975 | Tsuruta |
| 3,929,635 A | 12/1975 | Buriks et al. |
| 3,933,001 A | 1/1976 | Muska |
| 4,129,626 A | 12/1978 | Mellbom |
| 4,246,015 A | 1/1981 | Styring, Jr. |
| 4,270,937 A | 6/1981 | Adler et al. |
| 4,280,559 A | 7/1981 | Best |
| 4,281,518 A | 8/1981 | Muller et al. |
| 4,318,723 A | 3/1982 | Holmes et al. |
| 4,319,964 A | 3/1982 | Katz et al. |
| 4,336,233 A | 6/1982 | Appl et al. |
| 4,344,485 A | 8/1982 | Butler |
| 4,370,156 A | 1/1983 | Goddin, Jr. et al. |
| 4,382,912 A | 5/1983 | Madgavkar et al. |
| 4,383,841 A | 5/1983 | Ryan et al. |
| 4,405,585 A | 9/1983 | Sartori et al. |
| 4,417,449 A | 11/1983 | Hegarty et al. |
| 4,417,909 A | 11/1983 | Weltmer, Jr. |
| 4,421,535 A | 12/1983 | Mehra |
| 4,441,900 A | 4/1984 | Swallow |
| 4,459,142 A | 7/1984 | Goddin, Jr. |
| 4,462,814 A | 7/1984 | Holmes et al. |
| 4,466,946 A | 8/1984 | Goddin et al. |
| 4,511,382 A | 4/1985 | Valencia et al. |
| 4,512,782 A | 4/1985 | Bauer et al. |
| 4,533,372 A | 8/1985 | Valencia et al. |
| 4,551,158 A | 11/1985 | Wagner et al. |
| 4,563,202 A | 1/1986 | Yao et al. |
| 4,592,766 A | 6/1986 | Kumman et al. |
| 4,602,477 A | 7/1986 | Lucadamo |
| 4,609,388 A | 9/1986 | Adler et al. |
| 4,636,334 A | 1/1987 | Skinner et al. |
| 4,695,672 A | 9/1987 | Bunting |
| 4,697,642 A | 10/1987 | Vogel |
| 4,710,213 A | 12/1987 | Sapper et al. |
| 4,717,408 A | 1/1988 | Hopewell |
| 4,720,294 A | 1/1988 | Lucadamo et al. |
| 4,747,858 A | 5/1988 | Gottier |
| 4,761,167 A | 8/1988 | Nicholas et al. |
| 4,762,543 A | 8/1988 | Pantermuehl et al. |
| 4,769,054 A | 9/1988 | Steigman |
| 4,822,393 A | 4/1989 | Markbreiter et al. |
| 4,831,206 A | 5/1989 | Zarchy |
| 4,923,493 A | 5/1990 | Valencia et al. |
| 4,927,498 A | 5/1990 | Rushmere |
| 4,935,043 A | 6/1990 | Blanc et al. |
| 4,954,220 A | 9/1990 | Rushmere |
| 4,972,676 A | 11/1990 | Sakai |
| 4,976,849 A | 12/1990 | Soldati |
| 5,011,521 A | 4/1991 | Gottier |
| 5,062,270 A * | 11/1991 | Haut ............... F25J 3/0209 62/629 |
| 5,120,338 A | 6/1992 | Potts, Jr. et al. |
| 5,137,550 A | 8/1992 | Hegarty et al. |
| 5,152,927 A | 10/1992 | Rivers |
| 5,233,837 A | 8/1993 | Callahan |
| 5,240,472 A | 8/1993 | Sircar |
| 5,247,087 A | 9/1993 | Rivers |
| 5,265,428 A | 11/1993 | Valencia et al. |
| 5,335,504 A | 8/1994 | Durr et al. |
| 5,345,771 A | 9/1994 | Dinsmore |
| 5,567,396 A | 10/1996 | Perry et al. |
| 5,620,144 A | 4/1997 | Strock et al. |
| 5,643,460 A | 7/1997 | Marble et al. |
| 5,700,311 A | 12/1997 | Spencer |
| 5,720,929 A | 2/1998 | Minkkinen et al. |
| 5,819,555 A | 10/1998 | Engdahl |
| 5,820,837 A | 10/1998 | Marjanovich et al. |
| 5,899,274 A | 5/1999 | Frauenfeld et al. |
| 5,956,971 A | 9/1999 | Cole et al. |
| 5,964,985 A | 10/1999 | Wootten |
| 5,983,663 A | 11/1999 | Sterner |
| 6,053,007 A | 4/2000 | Victory et al. |
| 6,053,484 A | 4/2000 | Fan et al. |
| 6,082,133 A | 7/2000 | Barclay et al. |
| 6,082,373 A | 7/2000 | Sakurai et al. |
| 6,162,262 A | 12/2000 | Minkkinen et al. |
| 6,223,557 B1 | 5/2001 | Cole |
| 6,240,744 B1 | 6/2001 | Agrawal et al. |
| 6,267,358 B1 | 7/2001 | Gohara et al. |
| 6,270,557 B1 | 8/2001 | Millet et al. |
| 6,274,112 B1 | 8/2001 | Moffett et al. |
| 6,336,334 B1 | 1/2002 | Minkkinen et al. |
| 6,374,634 B2 | 4/2002 | Gallarda et al. |
| 6,401,486 B1 | 6/2002 | Lee et al. |
| 6,416,729 B1 | 7/2002 | DeBerry et al. |
| 6,442,969 B1 | 9/2002 | Rojey et al. |
| 6,500,982 B1 | 12/2002 | Hale et al. |
| 6,505,683 B2 | 1/2003 | Minkkinen et al. |
| 6,516,631 B1 | 2/2003 | Trebble |
| 6,517,801 B2 | 2/2003 | Watson et al. |
| 6,539,747 B2 | 4/2003 | Minta et al. |
| 6,565,629 B1 | 5/2003 | Hayashida et al. |
| 6,605,138 B2 | 8/2003 | Frondorf |
| 6,631,626 B1 | 10/2003 | Hahn |
| 6,632,266 B2 | 10/2003 | Thomas et al. |
| 6,662,872 B2 | 12/2003 | Gutek et al. |
| 6,708,759 B2 | 3/2004 | Léauté et al. |
| 6,711,914 B2 | 3/2004 | LeComte |
| 6,735,979 B2 | 5/2004 | LeComte et al. |
| 6,755,251 B2 | 6/2004 | Thomas et al. |
| 6,755,965 B2 | 6/2004 | Pironti et al. |
| 6,818,194 B2 | 11/2004 | DeBerry et al. |
| 6,883,327 B2 | 4/2005 | Iijima et al. |
| 6,946,017 B2 | 9/2005 | Leppin et al. |
| 6,958,111 B2 | 10/2005 | Rust et al. |
| 6,962,061 B2 | 11/2005 | Wilding et al. |
| 7,001,490 B2 | 2/2006 | Wostbrock et al. |
| 7,004,985 B2 | 2/2006 | Wallace et al. |
| 7,066,986 B2 | 6/2006 | Haben et al. |
| 7,073,348 B2 | 7/2006 | Clodic et al. |
| 7,121,115 B2 | 10/2006 | Lemaire et al. |
| 7,128,150 B2 | 10/2006 | Thomas et al. |
| 7,128,276 B2 | 10/2006 | Nilsen et al. |
| 7,152,431 B2 | 12/2006 | Amin et al. |
| 7,211,128 B2 | 5/2007 | Thomas M et al. |
| 7,211,701 B2 | 5/2007 | Muller D et al. |
| 7,219,512 B1 | 5/2007 | Wilding et al. |
| 7,285,225 B2 | 10/2007 | Copeland et al. |
| 7,325,415 B2 | 2/2008 | Amin et al. |
| 7,424,808 B2 | 9/2008 | Mak |
| 7,437,889 B2 | 10/2008 | Roberts et al. |
| 7,442,231 B2 | 10/2008 | Landrum |
| 7,442,233 B2 | 10/2008 | Mitariten |
| 7,493,779 B2 | 2/2009 | Amin |

(56) References Cited

U.S. PATENT DOCUMENTS

| | | | |
|---|---|---|---|
| 7,536,873 B2 | 5/2009 | Nohlen | |
| 7,550,064 B2 | 6/2009 | Bassler et al. | |
| 7,575,624 B2 | 8/2009 | Cartwright et al. | |
| 7,597,746 B2 | 10/2009 | Mak et al. | |
| 7,635,408 B2 | 12/2009 | Mak et al. | |
| 7,637,984 B2 | 12/2009 | Adamopoulos | |
| 7,637,987 B2 | 12/2009 | Mak | |
| 7,641,717 B2 | 1/2010 | Gal | |
| 7,662,215 B2 | 2/2010 | Sparling et al. | |
| 7,691,239 B2 | 4/2010 | Kister et al. | |
| 7,722,289 B2 | 5/2010 | Leone et al. | |
| 7,729,976 B2 | 6/2010 | Hill et al. | |
| 7,770,872 B2 | 8/2010 | Delatour | |
| 7,795,483 B2 | 9/2010 | Kulprathipanja et al. | |
| 7,806,965 B2 | 10/2010 | Stinson | |
| 7,814,975 B2 | 10/2010 | Hagen et al. | |
| 7,879,135 B2 | 2/2011 | Ravikumar et al. | |
| 7,901,583 B2 | 3/2011 | McColl et al. | |
| 7,955,496 B2 | 6/2011 | Iqbal et al. | |
| 8,002,498 B2 | 8/2011 | Leone et al. | |
| 8,020,408 B2 | 9/2011 | Howard et al. | |
| 8,133,764 B2 | 3/2012 | Dirks et al. | |
| 8,136,799 B2 | 3/2012 | Griepsma | |
| 8,303,685 B2 | 11/2012 | Schubert et al. | |
| 8,308,849 B2 | 11/2012 | Gal | |
| 8,312,738 B2 | 11/2012 | Singh et al. | |
| 8,372,169 B2 | 2/2013 | Tsangaris et al. | |
| 8,381,544 B2 | 2/2013 | Coyle | |
| 8,388,832 B2 | 3/2013 | Moffett et al. | |
| 8,428,835 B2 | 4/2013 | Habert et al. | |
| 8,475,572 B2 | 7/2013 | Prast et al. | |
| 8,500,105 B2 | 8/2013 | Nieuwoudt | |
| 8,529,662 B2 | 9/2013 | Kelley et al. | |
| 2002/0174687 A1 | 11/2002 | Cai | |
| 2002/0189443 A1 | 12/2002 | McGuire | |
| 2003/0181772 A1 | 9/2003 | Meyer et al. | |
| 2004/0148964 A1 | 8/2004 | Patel et al. | |
| 2006/0207946 A1 | 9/2006 | McColl et al. | |
| 2006/0239879 A1 | 10/2006 | Lallemand et al. | |
| 2007/0056317 A1 | 3/2007 | Amin et al. | |
| 2007/0144943 A1 | 6/2007 | Lemaire et al. | |
| 2007/0277674 A1 | 12/2007 | Hirano et al. | |
| 2008/0034789 A1* | 2/2008 | Fieler | C10L 3/10 62/623 |
| 2008/0091316 A1 | 4/2008 | Szczublewski | |
| 2008/0092589 A1 | 4/2008 | Trainer et al. | |
| 2008/0307827 A1 | 12/2008 | Hino et al. | |
| 2009/0023605 A1 | 1/2009 | Lebl et al. | |
| 2009/0220406 A1 | 9/2009 | Rahman | |
| 2010/0011809 A1 | 1/2010 | Mak | |
| 2010/0018248 A1 | 1/2010 | Fieler et al. | |
| 2010/0024472 A1 | 2/2010 | Amin et al. | |
| 2010/0064725 A1 | 3/2010 | Chieng et al. | |
| 2010/0107687 A1 | 5/2010 | Andrian et al. | |
| 2010/0132405 A1 | 6/2010 | Nilsen | |
| 2010/0147022 A1 | 6/2010 | Hart et al. | |
| 2010/0187181 A1 | 7/2010 | Sortwell | |
| 2010/0310439 A1 | 12/2010 | Brok et al. | |
| 2011/0132034 A1 | 6/2011 | Beaumont et al. | |
| 2011/0154856 A1 | 6/2011 | Andrian et al. | |
| 2011/0168019 A1 | 7/2011 | Northrop et al. | |
| 2011/0192190 A1 | 8/2011 | Andrian et al. | |
| 2011/0265512 A1 | 11/2011 | Bearden et al. | |
| 2012/0006055 A1 | 1/2012 | Van Santen et al. | |
| 2012/0031143 A1 | 2/2012 | Van Santem et al. | |
| 2012/0031144 A1 | 2/2012 | Northrop et al. | |
| 2012/0079852 A1 | 4/2012 | Northrop et al. | |
| 2012/0125043 A1 | 5/2012 | Cullinane et al. | |
| 2012/0204599 A1 | 8/2012 | Northrop et al. | |
| 2012/0279728 A1 | 11/2012 | Northrop et al. | |
| 2013/0032029 A1 | 2/2013 | Mak | |
| 2013/0074541 A1 | 3/2013 | Kaminsky et al. | |
| 2013/0098105 A1 | 4/2013 | Northrop | |
| 2014/0137599 A1 | 5/2014 | Oelfke et al. | |
| 2014/0270741 A1* | 9/2014 | Tiras | F24H 1/102 392/480 |
| 2015/0158796 A1 | 6/2015 | Valencia et al. | |
| 2015/0159939 A1 | 6/2015 | Valencia et al. | |
| 2015/0159940 A1 | 6/2015 | Valencia et al. | |
| 2015/0159941 A1 | 6/2015 | Valencia et al. | |
| 2015/0159942 A1 | 6/2015 | Valencia et al. | |
| 2015/0159943 A1 | 6/2015 | Valencia et al. | |
| 2015/0159944 A1 | 6/2015 | Valencia et al. | |
| 2015/0159945 A1 | 6/2015 | Valencia et al. | |
| 2015/0159946 A1 | 6/2015 | Valencia et al. | |
| 2015/0159947 A1 | 6/2015 | Valencia et al. | |

FOREIGN PATENT DOCUMENTS

| | | |
|---|---|---|
| EP | 0 508 244 | 10/1992 |
| EP | 1 338 557 | 8/2003 |
| GB | 1010403 | 11/1965 |
| WO | WO 2002/032536 | 4/2002 |
| WO | WO 2002/039038 | 5/2002 |
| WO | WO 2004/047956 | 6/2004 |
| WO | WO 2008/034789 | 3/2008 |
| WO | WO 2008/095258 | 8/2008 |
| WO | WO 2008/152030 | 12/2008 |
| WO | WO 2009/023605 | 2/2009 |
| WO | WO 2009/029353 | 3/2009 |
| WO | WO 2009/087206 | 7/2009 |
| WO | WO 2010/023238 | 3/2010 |
| WO | WO 2010/052299 | 5/2010 |
| WO | WO 2010/136442 | 12/2010 |
| WO | WO 2011/026170 | 3/2011 |
| WO | WO 2013/095828 | 6/2013 |
| WO | WO 2013/142100 | 9/2013 |

OTHER PUBLICATIONS

Amin, R. (2003) "Advanced Mini Natural Gas Liquefier," *LNG Journal*, Mar.-Apr. 2003, pp. 20-23.

Black, S. (2006) "Chilled Ammonia Process for CO2 Capture," *Alstom Position Paper*, Nov. 2006, 6 pgs.

Ciulla, Vincent (2007) "How the Engine Works," About.com, Mar. 21, 2007, [retrieved from the internet on Aug. 17, 2012]. <URL: http://autorepair.about.com/cs/generalinfo/a/aa060500a.html>.

"Cryogenics" *Science Clarified*, May 2, 2006 [retrieved from the internet on Aug. 17, 2012]. <URL: http://www.scienceclarified.com/Co-Di/Cryogenics.html>.

Denton, R. D. et al. (1985) "Integrated Low Temperature Processing of Sour Natural Gas," *Gas Processors Assoc., 64th Ann. Conv.*, pp. 92-96.

Guccione, E. (1963) "New Approach to Recovery of Helium from Natural Gas," *Chem. Engr.*, Sep. 30, 1963, pp. 76-78.

Hassan, S. M. N. (2005) "Techno-Economic Study of $CO_2$ Capture Process for Cement Plants," *University of Waterloo—Thesis*.

Haut, R. C. et al. (1988) "Development and Application of the Controlled Freeze Zone Process," *SPE 17757, SPE Gas Tech. Symp.*—Dallas, TX, pp. 435-443.

Haut, R. C. et al. (1988) "Development and Application of the Controlled Freeze Zone Process," *OSEA 88197, 7th Offshore So. East Asia Conf.*, Singapore, Feb. 1988, pp. 840-848.

Haut, R. C. et al. (1989) "Development and Application of the Controlled Freeze Zone Process," *SPE Production Engineering*, Aug. 1989, pp. 265-271.

Im, U. K. et al. (1971) "Heterogeneous Phase Behavior of Carbon Dioxide in n-Hexane and n-Heptane at Low Temperatures," *Jrnl. of Chem. Engineering Data*, v.16.4, pp. 412-415.

Mitariten, M. et al. (2007) "The Sorbead™ Quick-Cycle Process for Simultaneous Removal of Water, Heavy Hydrocarbons and Mercaptans from Natural Gas," *Laurance Reid Gas Conditioning Conf.*, Feb. 25-27, 2007.

Northrop, P. Scott et al. (2004) "Cryogenic Sour Gas Process Attractive for Acid Gas Injection Applications," *83rd Ann. Gas Processors Assoc. Convention*, New Orleans, LA., pp. 1-8 (XP007912217).

(56) References Cited

OTHER PUBLICATIONS

Pagcatipunan, C. et al. (2005) "Maximize the Performance of Spray Nozzle Systems," *CEP Magazine*, Dec. 2005, pp. 38-44.
Reyes, S. C. et al. (1997) "Frequency Modulation Methods for Diffusion and Adsorption Measurements in Porous Solids," *J. Phys. Chem. B*, v.101, pp. 614-622.
Rubin, E. S. et al. (2002) "A Technical, Economic and Environmental Assessment of Amine-based CO2 Capture Technology for Power Plant Greenhouse Gas Control," *U.S. Dept. of Energy*, Oct. 2002, DOE/DE-FC26-00NT40935, 26 pages.
Spero, C. (2007) "Callide Oxyfuel Project," *CS Energy, cLET Seminar*, Jul. 12, 2007, 9 pages.
Thomas, E. R. et al. (1987) "Conceptual Studies Using the Controlled Freeze Zone (CFZ) Process," *AlChE Summer Nat'l Mtg.*, Aug. 16-19, 1987.
Thomas, E. R. et al. (1988) "Conceptual Studies for $CO_2$/Natural Gas Separation Using the Control Freeze Zone (CFZ) Process," *Gas Separation and Purification*, v. 2, pp. 84-89.
Valencia, J. A. et al. (2008) "Controlled Freeze Zone™ Technology for Enabling Processing of High $CO_2$ and $H_2S$ Gas Reserves," SPE-IPTC 12708, Kuala Lumpur, IN, v.4.1, Jan. 2008, pp. 2358-2363.
Victory, D. J. et al. (1987) "The CFZ Process: Direct Methane-Carbon Dioxide Fractionation," *$66^{th}$ Ann. GPA Convention*, Mar. 16-18, Denver, CO.
Wilson, R.W. et al. (1968) "Helium: Its Extraction and Purification," *Journ. Petrol. Tech.*, v. 20, pp. 341-344.

\* cited by examiner

100

100B

100C

100D

800

HEATING COMPONENT TO REDUCE SOLIDIFICATION IN A CRYOGENIC DISTILLATION SYSTEM

CROSS REFERENCE TO RELATED APPLICATIONS

This application claims the benefit of U.S. Provisional Application Ser. No. 62/220,269 filed Sep. 18, 2015, the entirety of which is incorporated by reference herein.

FIELD OF THE DISCLOSURE

The present disclosure relates generally to cryogenic distillation systems to separate contaminants and impurities from methane in raw natural gas. More specifically, the disclosure relates to a cryogenic distillation column system having a heating component to reduce or prevent undesired solidification, and in particular to reduce or prevent solidification during system disturbances in the cryogenic distillation column system.

BACKGROUND OF THE DISCLOSURE

This section is intended to introduce various aspects of the art, which may be associated with exemplary examples of the present techniques. This description is believed to assist in providing a framework to facilitate a better understanding of particular aspects of the present techniques. Accordingly, it should be understood that this section should be read in this light, and not necessarily as admissions of prior art.

Most raw natural gas extracted from the Earth contains methane ($CH_4$), small amounts of other hydrocarbons and to varying degrees other compounds, i.e., contaminants. The methane component, as a low molecular weight hydrocarbon, is typically the desirable component within the raw natural gas. Compared to other carbon-based fuels, such as coal and oil, the burning of methane produces less carbon dioxide ($CO_2$) emissions for each unit of heat released. That is, based on its ratio of heat of combustion to its molecular mass, methane produces more heat per mass unit than complex hydrocarbons. Further, methane is generally transported with ease. Thus, in many cities, methane is piped into homes for domestic heating and cooking purposes. In this context, methane is usually known as natural gas. In the form of a compressed natural gas, $CH_4$ methane can be used as a vehicle fuel. Since natural gas is viewed as the preferred choice of fuel due to its advantages, the demand to provide effective techniques to separate and remove contaminants from raw natural gas has significantly increased.

The contaminants and impurities in the raw natural gas may include acid gas contaminants including $CO_2$, hydrogen sulfide ($H_2S$) and mercaptans, as well as nitrogen ($N_2$), helium (He), water vapor, liquid water, and mercury. Such contaminants and impurities may lead to equipment malfunction, production failure, and product contamination, among other detrimental production issues. For example, the $CO_2$ contaminant when combined with water may create a corrosive form of carbonic acid. Additionally, $CO_2$ may reduce the BTU value of the natural gas and lower the economic viability of the natural gas when it is present, for example, in concentrations of more than 2 mole %.

During normal operations of a cryogenic distillation column, the $CO_2$ contaminant, among other contaminants, may be separated and removed from the raw natural gas to produce a purified methane gas product. To start-up the cryogenic distillation column, before entering into normal operating conditions, various start-up techniques may be implemented. For instance, the start-up may be "assisted" by, for example, the use of solidification inhibitors or by using a clean methane flow to generate the initial liquid reflux during the start-up procedure. In contrast, unassisted start-ups generally do not involve the use of solidification inhibitors or clean methane. Instead, an "unassisted" start-up uses the raw natural gas that includes the contaminants, as described, and without solidification inhibitors, to generate the liquid reflux.

The aforementioned techniques may provide for start-up of a cryogenic distillation column where a clean liquid reflux may be generated for use during subsequent normal operating conditions. However, in the competitive business of cryogenic distillation and natural gas production, there remains an ongoing need for improved start-up techniques for cryogenic distillation systems.

SUMMARY

In one aspect of the present disclosure, a method for feeding a feed gas comprising methane ($CH_4$) and carbon dioxide ($CO_2$) to a cryogenic distillation column during start-up of the cryogenic distillation column is provided. The method includes producing an acid gas rich bottom stream and a freeze zone vapor stream. The method includes flowing the freeze zone vapor stream into a freezing section of the cryogenic distillation column. The freeze zone vapor stream may exit the cryogenic distillation column as an overhead stream. The method includes heating the overhead stream via a heating component to form a heated overhead stream. The heated overhead stream may reduce or prevent solidification of the $CO_2$ in the overhead stream. The method includes flowing the heated overhead stream into a heat exchanger to substantially reduce or prevent solidification. The method includes compressing the heated overhead stream via an overhead compressor to produce a high-pressure vapor. The method further includes reducing pressure of the high-pressure vapor to produce a liquid-vapor stream at an inlet of the cryogenic distillation column, where the liquid-vapor stream is introduced into the cryogenic distillation column as reflux.

In another aspect of the present disclosure, a cryogenic distillation system is provided herein. The cryogenic distillation system includes a cryogenic distillation column to receive a feed gas comprising methane and carbon dioxide that flows into the cryogenic distillation column. The cryogenic distillation column may discharge a freeze zone vapor stream as an overhead stream. The cryogenic distillation system includes a heating component configured to heat the overhead stream to produce a heated overhead stream to reduce or to prevent solidification of $CO_2$ in the overhead stream. The cryogenic distillation system includes a heat exchanger configured to receive the heated overhead stream. The cryogenic distillation system includes an overhead compressor to compress the heated overhead stream to produce a high-pressure vapor. The cryogenic distillation system further includes a Joule-Thomson (J-T) valve to receive the high-pressure vapor, where the pressure and temperature of the high-pressure vapor is reduced to produce a liquid-vapor stream exiting the J-T valve. The liquid-vapor stream may be introduced into the cryogenic distillation column.

In another aspect of the present disclosure, a method is provided. The method includes feeding a feed gas comprising carbon dioxide and methane into a cryogenic distillation column during start-up. The method includes producing an acid gas rich bottom stream and a freeze zone vapor stream in the cryogenic distillation column. The method includes flowing the freeze zone vapor stream into a freezing section of the cryogenic distillation column, where the freeze zone vapor stream exits the cryogenic distillation column as an overhead stream. The method includes heating the overhead stream via a heating component to form a heated overhead stream. The method includes flowing the heated overhead stream into a heat exchanger, where solidification of $CO_2$ in the heat exchanger is substantially reduced or prevented. The method includes compressing the heated overhead stream via an overhead compressor to produce a high-pressure vapor, where the heated overhead stream is compressed to a pressure where solidification of $CO_2$ is substantially reduced. The method includes reducing pressure and temperature of the high-pressure vapor via a Joule-Thomson (J-T) valve to produce a liquid-vapor stream. The method includes flowing the liquid-vapor stream into the cryogenic distillation column, where the liquid-vapor stream is introduced into the cryogenic distillation column to lower the concentration of $CO_2$ in the overhead stream. The method includes cycling the liquid-vapor stream in the cryogenic distillation column, where the cycling includes a cooling cycle that includes compression, heat exchange, and reduction in pressure and temperature. The method further includes continuously recycling the liquid-vapor stream in the cryogenic distillation column until the concentration of $CO_2$ is lowered to a non-solidifying range.

DESCRIPTION OF THE DRAWINGS

The advantages of the present techniques are better understood by referring to the following detailed description and the attached drawings, in which.

DETAILED DESCRIPTION

Figure 1:
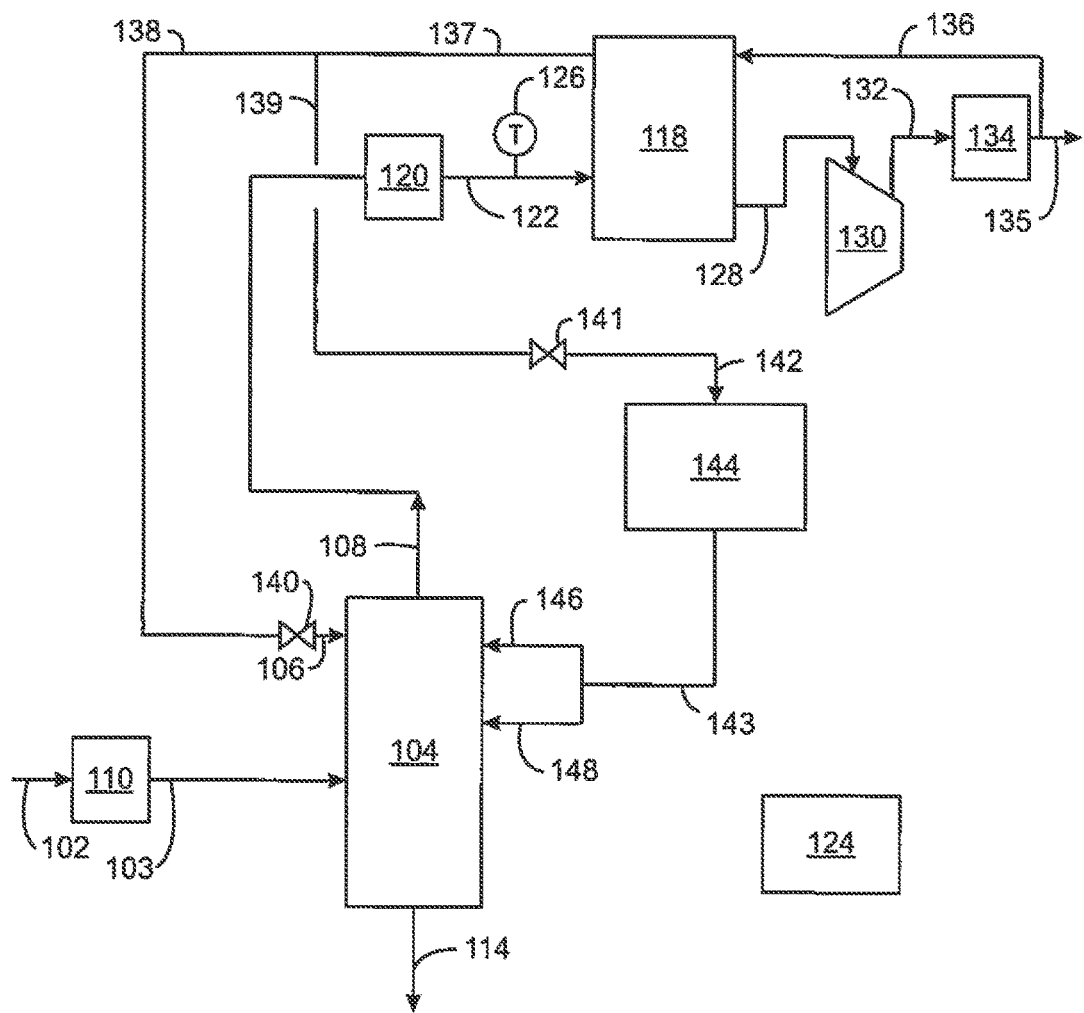
FIG. 1 is a block diagram of a system employing a cryogenic distillation column to purify natural gas, where an overhead stream is heated to reduce fouling during start-up operations.

In the following detailed description section, specific examples of the present techniques are described. However, to the extent that the following description is specific to a particular example or a particular use of the present techniques, this is intended to be for exemplary purposes only and simply provides a description of the exemplary examples. Accordingly, the techniques are not limited to the specific examples described below, but rather, include all alternatives, modifications, and equivalents falling within the true spirit and scope of the appended claims.

The present disclosure involves cryogenic distillation, and also the production and purification of natural gas. Embodiments described herein provide for a heating component to heat a distillation overhead stream in response to system disturbances that may cause undesired solidification. An example of a system disturbance is a relatively sudden increase in system temperature and the associated equilibrium rise in the concentration of a component or contaminant that can solidify.

Such an increase in the temperature and the contaminant (e.g., $CO_2$) concentration in the overhead stream (e.g., natural gas product or methane) from the distillation column could lead to solidification. For instance, the overhead stream with a higher concentration of $CO_2$ may be placed into an operating equilibrium region to produce solidified $CO_2$ upon entering the lower temperature overhead system. In response, the heating component may heat the overhead stream, including the solidified $CO_2$, to move the condition of the stream away from the operating equilibrium region. The use of the heating component may reduce or prevent $CO_2$ solidification and blockage in the overhead equipment.

Moreover, the present techniques may determine and implement a temperature margin for the stream to distance the operating state of the stream away from the equilibrium region at which solidification occurs. Therefore, a control system may (1) maintain the temperature of the overhead at a set point via regulation of the amount of heat added via the heater, and (2) determine the desired temperature margin and thus, the set point temperature of the overhead stream. While the discussion herein may focus on start-up of the distillation column, the techniques may also be applicable after start-up.

At the outset, for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

As one of ordinary skill would appreciate, different persons may refer to the same feature or component by different names. This document does not intend to distinguish between components or features that differ in name only. The figures are not necessarily to scale. Certain features and components herein may be shown exaggerated in scale or in schematic form and some details of conventional elements may not be shown in the interest of clarity and conciseness. When referring to the figures described herein, the same reference numerals may be referenced in multiple figures for the sake of simplicity. In the following description and in the claims, the terms "including" and "comprising" are used in an open-ended fashion, and thus, should be interpreted to mean "including, but not limited to."

The term "acid gas" refers to any gas that dissolves in water to produce an acidic solution. Non-limiting examples of acid gases include hydrogen sulfide ($H_2S$), carbon dioxide ($CO_2$), sulfur dioxide ($SO_2$), and mixtures thereof. The term "trace sulfur compounds" includes carbon disulfide ($CS_2$), carbonyl sulfide (COS), mercaptans, and mixtures thereof. The term "acid gas injection" (AGI) refers to the disposal of an acid gas stream by increasing its pressure and introducing the pressurized stream into a subterranean reservoir.

The term "cooling cycle" refers to a refrigeration system comprising compression, heat exchange, and pressure reduction.

The term "cryogenic" in the natural gas industry is used to refer to low temperature conditions, such as −40 degrees Fahrenheit (−40 degrees Celsius) or colder. The low temperature conditions are often those involved with propane at atmospheric pressure or colder refrigerants. Cryogenic used in reference to a fluid means that the fluid is at a cryogenic temperature. Cryogenic used in reference to an item or material means that the item or material is suitable for operating at a cryogenic temperature and/or suitable for containing a cryogenic fluid. For example, a cryogenic vessel is a vessel that is suitable for containing a cryogenic fluid.

The term "cryogenic distillation" refers to a distillation process that is carried out at conditions involving cryogenic temperatures.

The term "Controlled Freeze Zone™ (CFZ™) process" refers to a cryogenic distillation process that takes advantage of the freezing potential of carbon dioxide in cryogenic distillation, rather than avoiding solidification of carbon dioxide. In the CFZ™ process, acid gas components are separated by cryogenic distillation through the controlled freezing and melting of carbon dioxide in a distillation column, without the use of freeze-suppression additives. The CFZ™ process uses a cryogenic distillation column with a CFZ™ section to handle the solidification and subsequent melting of $CO_2$ in a controlled fashion. The freezing section does not contain packing or typical trays like in conventional distillation columns. Instead, the freezing section contains one or more spray nozzles and a melt tray. In operation, solid $CO_2$ forms in the vapor space in the freezing section and falls into a liquid on the melt tray. Substantially all of the solids that form are confined to the freezing section. The portions of the distillation column above and below the freezing section of the column may be similar to conventional cryogenic demethanizer columns. For example, in the rectification section above the freezing section, methane ($CH_4$) is enriched to produce an overhead methane-rich stream for sale, while the stripping section below the freezing section generates a liquid bottoms stream containing contaminants such as $CO_2$ and hydrogen sulfide ($H_2S$) with very little residual methane. This acid gas rich bottoms stream may be disposed as waste or further processed.

The term "heat exchanger" refers to a device designed to efficiently transfer or "exchange" heat from one matter to another. Exemplary heat exchanger types include a co-current or counter-current heat exchanger, an indirect heat exchanger (e.g. spiral wound heat exchanger, plate-fin heat exchanger such as a brazed aluminum plate fin type, shell-and-tube heat exchanger, etc.), direct contact heat exchanger, or a combination thereof.

The terms "rectifying section," "rectifying zone," "rectification section," and "rectification zone" refer to the stage above a feed point of a distillation column where the concentration of the more volatile component increases in both the liquid and the vapor. In particular examples of a cryogenic column processing natural gas, the rectifying section refers to a section of the cryogenic distillation column where an overhead methane-rich vapor stream may be purified to meet pipeline or liquid natural gas (LNG) feed quality via conventional distillation.

The term "reflux" refers to a stream derived from a distillation column overhead and re-introduced into the distillation column at any location above the location at which the feed stream is introduced into the column. The reflux can be used to reduce the content of heavy components in the overhead product stream.

The terms "stripping section" and "stripping zone" refer to the stage below the feed point of a distillation column where the concentration of the more volatile component decreases in both the liquid and the vapor. In the present disclosure, the stripping section refers to a section of a cryogenic distillation column where a liquid bottoms stream, containing contaminants such as $CO_2$ and $H_2S$, may be processed to "strip" or recover valuable methane while discharging $CO_2$ as a bottoms stream, which may be used for injection into a well or for use in enhanced oil recovery efforts.

The term "substantially" and other words of degree are relative modifiers intended to indicate permissible variation from the characteristic so modified. It is not intended to be limited to the absolute value or characteristic which it modifies but rather possessing more of the physical or functional characteristic than its opposite, and preferably, approaching or approximating such a physical or functional characteristic.

A distillation process may be used to separate contaminants from a raw natural gas stream. The distillation process is the most widely used way of effecting relative volatility based separations. However, the separation of carbon dioxide ($CO_2$) from natural gas, e.g., methane ($CH_4$), by distillation involves cryogenic temperatures that lead to solidification of $CO_2$ in an intermediate portion of the distillation column. The solidified $CO_2$ may plug and render the distillation column inoperable. The Controlled Freeze Zone™ (CFZ™) process is a type of cryogenic distillation process that is used to separate mixtures based on their relative volatility and where one or more components in the mixture may solidify. The CFZ™ process may include a distillation column that includes a specially designed freezing section, such as a CFZ™ section, to address the freezing and melting of solids within this intermediate portion of the column. Specifically, the freezing section acts to control and to confine the freezing and melting of solids within its section.

During normal operations, the cryogenic distillation operations may include feeding the natural gas into the distillation column where an overhead stream that includes lighter vapors (e.g., $CH_4$ vapors), may rise upward into the freezing section and into a rectification zone. Contaminants, for example, acid gases that includes $CO_2$, may be removed. In particular, the distillation column may be used to handle an acid gas stream with a wide range of $CO_2$ content, for example, from about 8 mole % to about 75 mole %. The overhead stream may be partially condensed to provide a liquid reflux that may be collected in a reflux accumulator. The liquid reflux in the reflux accumulator may be refluxed (e.g., via a reflux pump and piping) into the rectification zone to continue the separation and removal of the contaminants.

However, before the distillation column can produce a purified $CH_4$ gas product at normal operating conditions, the column generally undergoes start-up if the column has been shut down or idled, for example. The start-up technique, as described herein, may include taking the distillation column from initial operating conditions to normal operating conditions. For example, during the start-up technique, a liquid spray to the freezing section may be produced. The liquid spray may be used to lower the concentration of contaminants in the overhead stream. As the contaminant concentration is lowered to a normal range, normal operations may begin. In particular, the overhead stream may be condensed and diverted to the reflux accumulator to provide the liquid reflux used during normal operations.

Several techniques have been devised to start cryogenic distillation columns. One technique makes use of solidification inhibitors during startup, while another employs an external relatively clean methane to generate clean reflux liquids during start-up. These two examples may be characterized as an assisted startup. Yet another technique, the unassisted technique depends primarily or only on the components available to the unit from the feed gas and generally has no requirements for external or special fluids.

In the present disclosure, the start-up technique may use the overhead stream in a cooling cycle of the cryogenic distillation column. The cooling cycle, as described herein, may include the cooling and compression of the overhead stream to give a liquid for the liquid spray into the freezing section of the column. During the initial phase of the start-up technique, the overhead stream may include a high concentration of $CO_2$ contaminant, for example, about 20 mole % as compared to about a 2 mole % during normal operations. Unfortunately, at these higher concentrations of $CO_2$ during startup, the stream may be near the conditions at which the $CO_2$ solidifies.

The start-up of the distillation column involves establishing the appropriate distillation column temperature and composition profiles that provide the desired separations and product purities while limiting the solidification and melting of solids to within the freezing section. Unfortunately, system disturbances in the cryogenic distillation process that may occur during start-up operations may cause the contaminants to solidify outside of the freezing section. For example, the formation of solid $CO_2$ may accumulate on system equipment and eventually lead to plugging and equipment malfunction.

The present disclosure is directed to a method and a system to confine solid component formation to a freezing section of a cryogenic distillation column during start-up operations in order to prevent or reduce fouling of downstream process equipment. Again, during start-up operations, the overhead stream discharging from the cryogenic distillation column may include contaminants (e.g., $CO_2$) that could solidify during the start-up operations. Thus, the overhead stream may be fed through a heating component to provide the overhead stream with a temperature margin away from solidification conditions and reduce the likelihood of contaminant solidification.

Such heated overhead stream may enter into the cooling cycle to undergo compression, heat exchange, and pressure reduction. The continuous progression of the cooling cycle may generate a liquid spray into the column to lower the concentration of the contaminants in the overhead stream. Once the concentration of contaminants is lowered to a non-solidifying range in the overhead stream, the cooling cycle loop may be discontinued and the cryogenic distillation column may enter into normal operations to produce a purified $CH_4$ gas product.

FIG. 1 is a block diagram of a system 100 employing a cryogenic distillation column to purify natural gas, where an overhead stream is heated to reduce fouling during start-up operations. A feed gas 102 (e.g., natural gas from a well) may be fed into the system 100 and may include methane ($CH_4$) and at least one acid gas component, e.g., carbon dioxide ($CO_2$). In one or more embodiments, the feed gas 102 may include a $CO_2$ concentration ranging from about 8 mole % to about 75 mole %, or from about 20 mole % to about 75 mole %, or from about 35 mole % to about 75 mole %, or from about 50 mole % to about 75 mole %, along with concentrations of hydrogen sulfide ($H_2S$), mercaptans, heavier hydrocarbons, among other contaminants and impurities. At higher concentrations, the $CO_2$ contaminant acts as a diluent and significantly lowers the energy content of natural gas. In the presence of water, the $CO_2$ contaminant renders the natural gas as a corrosive gas. Removal of the $CO_2$ contaminant from the feed gas 102 is desirable to provide a natural gas product for delivery to a pipeline, natural gas liquids recovery, helium recovery, nitrogen recovery, or conversion to liquid natural gas, among others applications.

A cryogenic process, using a cryogenic distillation column 104, may be employed to separate and remove the $CO_2$ contaminant from the feed gas 102. For example, the cryogenic distillation column 104 may be a Controlled Freeze Zone™ (CFZ™) column used for the condensation, separation, and removal of the $CO_2$ contaminant from the feed gas 102 to produce a purified $CH_4$ gas product during normal operations. However, before normal operations can begin, start-up operations may take place to move the cryogenic distillation column 104 from ambient conditions, e.g., empty state, and into normal operations, e.g. a steady state.

As will be further described, the start-up operations of the system 100 may produce a start-up stream 106 that may serve as a spray to lower the concentration of the $CO_2$ contaminant in the feed gas 102. The start-up operations may include a cooling cycle, as will be later described, that continually recycles an overhead stream 108 until its concentration of $CO_2$ is lowered to a normal, non-solidifying range of about 2 mole % to about 6 mole %.

However, there are often many challenges related to the start-up of a cryogenic distillation column due to nonlinear and wide operating ranges of the column during transient periods. For instance, process disturbances during start-up operations may increase the temperature and, as a result, the corresponding concentration of $CO_2$ in the overhead stream 108 exiting the cryogenic distillation column 104. Thus, in some cases, the $CO_2$ in the overhead stream 108 may solidify outside of a freezing section of the cryogenic distillation column 104 upon contacting downstream process equipment already cooled to lower temperatures.

In operation, the feed gas 102 may enter a feed chiller 110 where its temperature may be lowered, for example to a temperature of about −60° F., to generate a chilled feed gas 103. In one or more embodiments, the feed chiller 110 may be an indirect heat exchanger, a refrigerated chiller, and/or an expansion device such as a Joule-Thompson (J-T) valve. A chilled feed gas 103 may emerge from the feed chiller 110 to be introduced into the cryogenic distillation column 104. Of course, other processing of the feed gas 102 prior to introduction to the cryogenic distillation column 104 may be implemented.

The chilled feed gas 103 may be introduced into the cryogenic distillation column 104 at the stripping section to produce an acid gas rich bottom stream 114 and a freeze zone vapor stream. The freeze zone vapor stream, richer in the more volatile compound $CH_4$, may flow upwards through the freezing section of the cryogenic distillation column 104 and continue through the rectifying section of the cryogenic distillation column 104. The freeze zone vapor stream may exit the cryogenic distillation column 104 as the overhead stream 108.

A process disturbance, such as a momentary warming of the overhead stream 108, may increase the temperature and concentration of the $CO_2$ and thus, increase the potential for $CO_2$ solid formation outside of the ccryogenic distillation column 104. For example, at increased $CO_2$ concentration in the overhead stream 108, the $CO_2$ may solidify when in contact with and accumulate on cooled downstream process equipment, for example, a heat exchanger 118, such as a brazed aluminum heat exchanger (BAHX). In one or more embodiments, the heat exchanger 118 may be a plate and fin heat exchanger with narrow-spaced fins that are protected from damaging materials via a filtering material. Because the thermal mass of the heat exchanger 118 may be substantially large relative to the thermal mass of the overhead stream 108, the temperature of the heat exchanger 118 may not immediately adjust to the overhead stream temperature and $CO_2$ concentration fluctuations. Thus, the increased $CO_2$ concentration in the warmer overhead stream 108 may solidify and accumulate on the temporarily-cooler filtering material, fins, or both, upon contacting the cold metal of the heat exchanger 118. The accumulation of solid $CO_2$ may lead to the plugging and malfunctioning of the heat exchanger 118.

In the present disclosure, a heating component 120 may be placed upstream of the heat exchanger 118 (e.g., at or near the inlet of the heat exchanger 118) to reduce the possibility of $CO_2$ solidifying in the overhead stream 108 during a process disturbance of the system 100. In particular, the heating component 120 may heat the overhead stream 108 to prevent, or reduce the possibility of, the $CO_2$ contaminant from solidifying and accumulating on the heat exchanger 118 or other downstream process equipment in the system 100. Accordingly, the heating component 120, as described, may provide an operating temperature margin against the $CO_2$ contaminant solidifying outside of the ccryogenic distillation column 104 in the overhead system. As shown in FIG. 1, the overhead stream 108 may exit the top outlet of the ccryogenic distillation column 104 and flow through or adjacent the heating component 120 to form a heated overhead stream 122.

In one or more embodiments, the heating component 120 may increase the temperature of the overhead stream 108 by about 0.5° F. to about 10° F. to maintain a specified temperature margin in the heated overhead stream 122. The temperature margin, as described herein, may be based on measurements of the pressure, temperature, and composition of the heated overhead stream 122. A control system 124 may employ techniques to calculate or determine the specified temperature margin. The temperature margin may be the temperature difference (AT) between the actual temperature of the heated overhead stream 122 and the temperature at which $CO_2$ solidification would occur in the overhead stream 108 given its current $CO_2$ concentration. In some embodiments, the increase in the temperature of the overhead stream 108 may be greater than 0.5° F., or greater than 1° F., or greater than 1.5° F., or greater than 2° F., and may range from about 0.5° F. to about 10° F., or from about 0.5° F. to about 5° F., or from about 1° F. to about 3° F., or from about 1.5° F. to about 2.5° F. In embodiments, as will be further described herein, the heating component 120 may include various elements used to heat the overhead stream 108 including an inline heater, heat-tracing, a tee to receive an introduced warm stream, an external heat exchanger, and combinations thereof.

The control system 124 may implement a control scheme (e.g., executable logic and associated hardware) that receives a measured temperature value of the heated overhead stream 122 (e.g., from a temperature indicator 126) and adjusts the amount of heating by the heating component 120 to maintain the temperature of the heated overhead stream 122 at a desired set point. The control system 124 may also calculate or determine the aforementioned desired temperature margin to provide the set point of the control block for the temperature of the heated overhead stream 122.

The control system 124 may include a distributed control system (DCS), programmable logic controller (PLC), and so on. The control system 124 may have a human interface (HMI) and facilitate control of the system 100 including the heating component 120. In general, the control system 124 may direct the operation of equipment associated with the system 100 and its heating component 120. The control system 124 may include instrumentation, computers, computer memory, a processor, and so forth. Further, the control system 124 may include control schemes stored in memory and executable by the processor to implement or facilitate control actions associated with the operation of the equipment.

The control system 124 may direct the operation of equipment, such as a control valve or a resistor, associated with the heating component 120 in order to regulate the amount of heat that the heating component 120 provides to the overhead stream 108. In some cases, a temperature indicator 126 located at an inlet of the heat exchanger 118 may measure and indicate the temperature of the heated overhead stream 122 entering the heat exchanger 118. The temperature indicator 126 may have a temperature sensor, such as a thermocouple or resistance temperature detector (RTD). A control scheme or block of the control system 124 may use the measured temperature provided by the temperature indicator 126 as an input value to adjust operation of the heating component 120. The adjustment of the operation of the heating component 120 may regulate the temperature of the heated overhead stream 122 (e.g., to a set-point temperature). Furthermore, the control system 124 and this control scheme may employ a real-time computation of a temperature margin to be specified for the heated overhead stream 122, and a corresponding input value to adjust the heating component 120. As previously explained, the heating component 120 may increase the temperature of the overhead stream 108 such that the heated stream 122 is about 0.5° F. to about 10° F. warmer than stream 108.

With the heated overhead stream 122 flowing through the heat exchanger 118, the start-up operations may continue with little or desirably no $CO_2$ accumulation on the heat exchanger 118 or other downstream process equipment. The heated overhead stream 122 flows through an inlet of the heat exchanger 118 and is further warmed by the heat exchanger 118 to produce a warm vapor stream 128. In some embodiments, the temperature of the warm vapor stream 128 may vary as it exits the heat exchanger 118 due to the various factors related to the system 100, for example, ambient temperature conditions, among others. The warm vapor stream 128 may be compressed via a compressor 130. In some embodiments, the compressor 130 may increase the pressure of the warm vapor stream 128 from about 600 psig to about 1250 psig. A high-pressure vapor stream 132 discharged from the compressor 130 may have the same or similar composition as the heated overhead stream 122 that entered the heat exchanger 118. As illustrated in FIG. 1, the high-pressure vapor stream 132 is cooled in a cooler 134 to produce a cooled compressed vapor stream. A portion of the cooled compressed vapor stream may be recycled as a recycled vapor stream 136. The recycled vapor stream 136 may be further cooled in the heat exchanger 118 to produce stream 137 at an eventual target operating temperature at steady conditions of about −90° F. Another portion of the cooled compressed vapor stream may exit the cooler 134 as a product stream 135.

At least a portion 138 of the high-pressure vapors 137 may exit the heat exchanger 118 to be expanded by an expansion device 140, such as a Joule-Thompson (JT) valve or a turbo-expander. The expansion device 140 may lower the pressure and the temperature of the high-pressure vapors 138. In some cases, the high-pressure vapors 138 may experience a pressure drop to a pressure in a range of about 550-600 psig and a temperature drop to a temperature in the range of about −60° F. to −120° F., depending on the particular stage occurring during startup. The expansion device 140 may expand the high-pressure vapors 138 to generate liquids, at least partially, in the liquid-vapor stream 106.

In one or more embodiments, the liquid-vapor stream 106 may act as a spray to reduce the concentration of $CO_2$ in the freeze zone vapor stream, i.e., the overhead stream 108 that exits the cryogenic distillation column 104. For instance, the cooling cycle may provide recycling of the overhead stream 108 that exits and flows back into the cryogenic distillation column 104 as the liquid-vapor stream 106. During this recycling, the overhead stream 108, which is in vapor form, rises within the cryogenic distillation column 104 to be contacted by the liquid-vapor stream 106. The contact between the vapor in the overhead stream 108 and the colder liquid-vapor stream 106 may act to progressively lower the temperature of the overhead stream 108 as it is continuously recycled in the cooling cycle. In operation, the temperature may drop to as low as about −120° F. over a period of time as it exits the cryogenic distillation column 104. Additionally, as the temperature of the overhead stream 108 is lowered, the concentration of $CO_2$ in the overhead stream 108 is substantially lowered. For example, after recycling, the concentration of $CO_2$ in the overhead stream 108 exiting the cryogenic distillation column 104 may eventually reach the non-solidifying range, e.g., about 2 mole % to about 6 mole %. At this time, the start-up operations may come to an end and normal operations may begin with the accumulation of normal liquid reflux during normal operations.

During normal reflux generation, for example, a portion 139 of the high-pressure vapors 137 exiting the heat exchanger 118 may be diverted to an expansion device 141, such as a JT valve, to generate reflux liquid 142 that may accumulate in a reflux accumulator 144. The reflux liquid 143 coming from the reflux accumulator 144 may split into a reflux stream 146 to flow into the rectification section and into a reflux stream 148 to flow into the stripping section of the cryogenic distillation column 104. Once a sufficient amount of reflux liquid accumulates at the bottom of the rectification section, it may serve as a normal source of spray in the cryogenic distillation column 104 for use during normal operations. The flow of the reflux streams 146, 148 into the cryogenic distillation column 104 indicates the end of the start-up conditions and the start of normal operating conditions to produce a purified $CH_4$ gas product.

The heating component 120 may include but is not restricted to: (1) an inline heater in the pipe conveying the stream 108 leading to the heat exchanger 118; (2) heat tracing on the pipe conveying the stream 108 leading to the heat exchanger 118; (3) a recycled slipstream from the compressor 130 discharge (inter-stage or final discharge) to the overhead stream 108; and (4) a diverted portion of the stream 108 to an external heater and later blended with the remainder of the stream 108. These options are discussed below in more detail. Of course, other alternatives for the heating component 120 may be implemented.

Figure 2:
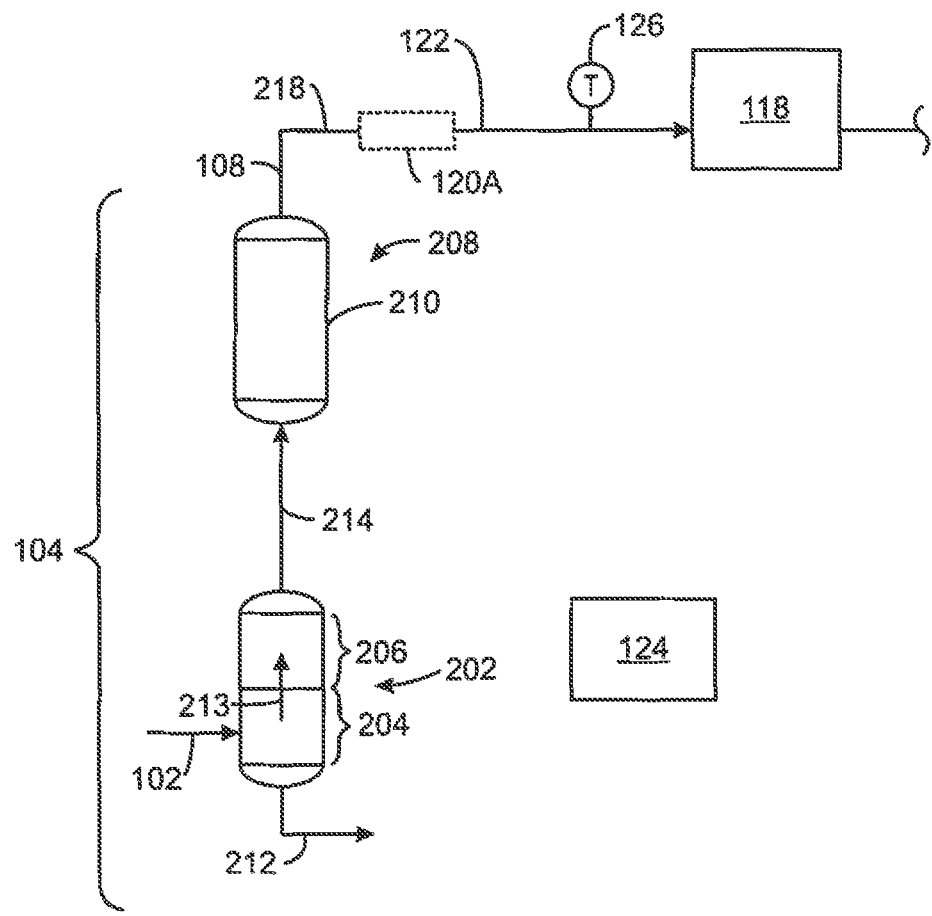
FIG. 2 is a simplified process flow diagram of a system employing a cryogenic distillation column to purify natural gas, where an overhead stream is heated using an inline heater to reduce fouling during start-up operations.

FIG. 2 is a simplified process flow diagram of a system 100A employing a cryogenic distillation column 104 to purify natural gas, where an overhead stream 108 is heated using an inline heater 120A to prevent fouling during start-up operations. Like numbered items are as described with respect to FIG. 1. The inline heater 120A can be any device located inside the process piping that can provide heat directly to the overhead stream 108 about to enter the cold pass of the heat exchanger 118. The inline heater 120A can include, but is not limited to, electrical resistance heaters, or heating conduits such as tubing, piping, or coils. The output of the inline heater 120A or the flow and/or temperature of the fluid flowing through the inline heater 120A may be adjusted to maintain the desired temperature margin in the heated overhead stream 122.

As shown in FIG. 2, the system 100A includes the cryogenic distillation column 104 configured in a split-tower design that includes two columns 202 and 208. Such may be implemented in an effort to facilitate offshore deployment, to provide for ease of transportation and installation, to facilitate start-up of the cryogenic distillation column 104, and so forth. In FIG. 2, the cryogenic distillation column 104 includes the column 202 where a stripping section 204 and a freezing section 206 are disposed. The column 208 of the cryogenic distillation column 104 includes a rectification section 210 and may be located above the freezing section 206. The arrangement of the columns may vary depending on usage requirements. For example, a single column including the stripping section 204, the freezing section 206, and the rectification section 210 may represent the cryogenic distillation column 104.

During start-up operations, the feed gas 102 may be introduced into the cryogenic distillation column 104 at the stripping section 204 to produce a $CO_2$ rich bottom stream 212 and a freeze zone inlet vapor stream 213. The $CO_2$ rich bottom stream 212 may exit the cryogenic distillation column 104 at a bottom outlet, as shown in FIG. 2. The freeze zone inlet vapor stream 213 may flow upward in the freezing section 206 to exit as a freeze zone vapor outlet stream 214. The freeze zone vapor outlet stream 214 may continue to flow upwards into the rectification section 210, where it may exit the rectification section 210 as the overhead stream 108.

The overhead stream 108 flows to the inline heater 120A to be heated. As mentioned, the inline heater 120A may be located inside a flow line 218 that carries the overhead stream 108. In this manner, the overhead stream 108 may be directly heated by the inline heater 120A to form the heated overhead stream 122.

The control system 124 may regulate the amount of heat emitted by the inline heater 120A. For example, the amount of heat emitted may be adjusted to maintain the desired temperature margin in the heated overhead stream 122, as previously described. Adding heat via the inline heater 120A may reduce or prevent solidification of the $CO_2$ in the heated overhead stream 122 during a system disturbance. With the implementation of the inline heater 120A, the heated overhead stream 122 flowing into the heat exchanger 118 may beneficially experience a substantially low occurrence, and desirably no occurrence, of solid $CO_2$ accumulation on the heat exchanger 118 or other downstream process equipment. The system 100A may continue as described with respect to the system 100 in a cooling cycle until normal operating conditions are reached. The cooling cycle may also be employed during normal operations.

Figure 3:
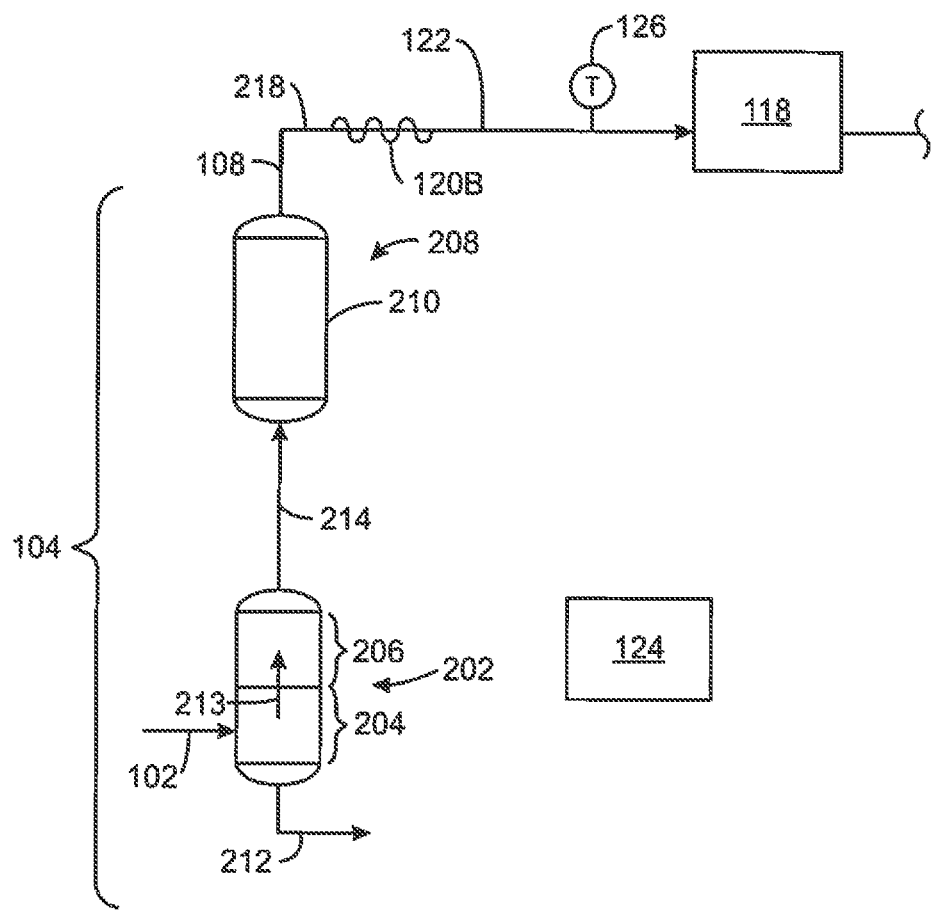
FIG. 3 is a simplified process flow diagram of a system employing a cryogenic distillation column to purify natural gas, where an overhead stream is heated using heat tracing to reduce fouling during start-up operations.

FIG. 3 is a simplified process flow diagram of a system 100B employing a cryogenic distillation column to purify natural gas, where an overhead stream 108 is heated using heat tracing (e.g., electrical tracing, steam tracing, etc.) 120B to prevent undesired solidification and fouling during start-up operations. Like numbered items are as described with respect to FIGS. 1 and 2. The system 100B may heat the overhead stream 108 via heat-tracing 120B disposed on and external to the flow line 218 leading to the heat exchanger 118. The heat-tracing 120B may take the form of an electrical heating element that extends in physical contact along a portion of the length of the flow line 218. In some embodiments, if steam is available, the heat-tracing 120B may take the form of a steam heating trace.

A control system 124 may regulate the amount of heat emitted, e.g., electrical output, by the heat tracing 120B if electrical tracing is used—or regulate the amount of steam through the heat-tracing 120B if steam tracing is used—in order to maintain the desired temperature margin in the heated overhead stream 122, as previously described. In some cases, inline vanes or similar mixing components may be disposed within the flow-line 218 to provide mixing for a uniform temperature throughout the heated overhead stream 122. The heat-tracing 120B may reduce or prevent solidification of the $CO_2$ in the overhead stream 108 during a system disturbance, as previously described. The heated overhead stream 122 flowing into the heat exchanger 118 may provide for a substantially low occurrence, and desirably no occurrence, of solid $CO_2$ accumulation on the heat exchanger 118 or other downstream process equipment. The system 100B may continue as described with respect to system 100 until normal operating conditions are reached.

Figure 4:
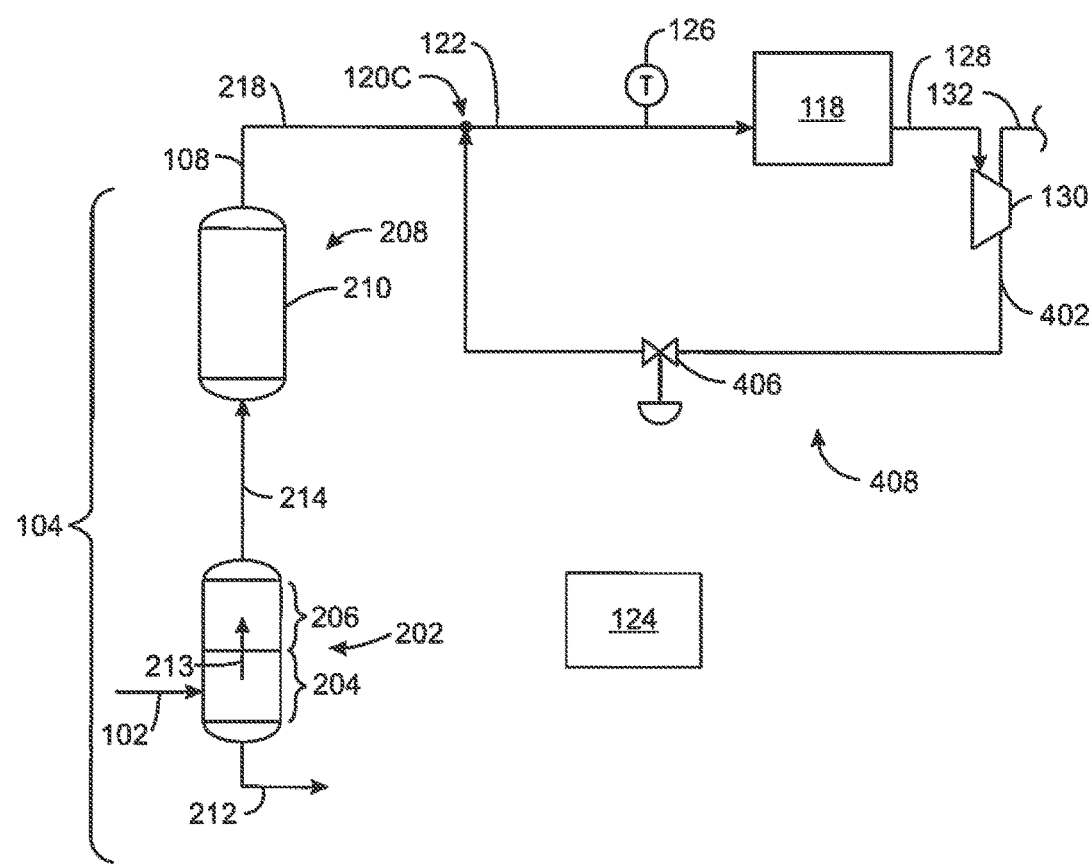
FIG. 4 is a simplified process flow diagram of a system employing a cryogenic distillation column to purify natural gas, where an overhead stream is heated using a recycled slipstream to reduce fouling during start-up operations.

FIG. 4 is a simplified process flow diagram of a system 100C employing a cryogenic distillation column to purify natural gas, where an overhead stream 108 is heated using a heating component 120C that receives a recycled warm slipstream to prevent fouling during start-up operations. Like numbers are as described with respect to FIGS. 1 and 2. The heating component 120C may include a pipe tee disposed on the pipe conveying the overhead stream 108 to receive the recycle stream. The heating component 120C may further include a recycle line 408.

As indicated, the overhead stream 108 that flows into the cold pass of the heat exchanger 118 goes into the compressor 130. As such, the compressor discharge has in essence the same composition (except for the momentary compositional disturbances) and a higher pressure and temperature than the overhead stream 108. A slipstream 402 of the compressor 130 discharge can be recirculated to the inlet of the heat exchanger 118 to provide the desired temperature margin by adjustment of the recycle flow rate (e.g., via a flow control valve 406).

For example, the compressor 130 may receive the warm vapor stream 128 and increase its pressure to form the high-pressure vapor stream 132. A portion of the stream 132 may be diverted from the compressor 130 to form a slipstream 402 of the high-pressure vapor stream 132. The slipstream 402 may be a portion or slipstream from an inter-stage discharge or a final discharge of the compressor 130. The slipstream 402 may be recycled upstream of the heat exchanger 118. The slipstream 402 may blend into the overhead stream 108 via a recycle line and at a pipe tee that may act as the heating component 120C. The heated overhead stream 122 may be formed using the heating component 120C, and flow into the heat exchanger 118.

As illustrated, the flow control valve 406 may be located in the recycle line 408 that carries the slipstream 402. The flow control valve 406 may regulate and adjust the flow rate of the slipstream 402 as it is discharged from the compressor 130.

A control scheme of the flow control valve 406 may use the measured temperature provided by the temperature indicator 126 as an input value to adjust the flow control valve 406 to regulate and control the temperature of the heated overhead stream 122 to a set-point temperature. In addition, the control scheme of the flow control valve 406 may use a real-time computation of a temperature margin to determine the set-point temperature.

The slipstream 402, when blended with the overhead stream 108, may reduce or desirably prevent solidification of $CO_2$ during a system disturbance, as previously described. For example, the heated overhead stream 122 flowing into the heat exchanger 118 may provide a substantially low occurrence, and desirably no occurrence, of solid $CO_2$ accumulation on the heat exchanger 118 or other downstream process equipment. The system 100C may continue as described with respect to system 100 until normal operating conditions are reached.

Figure 5:
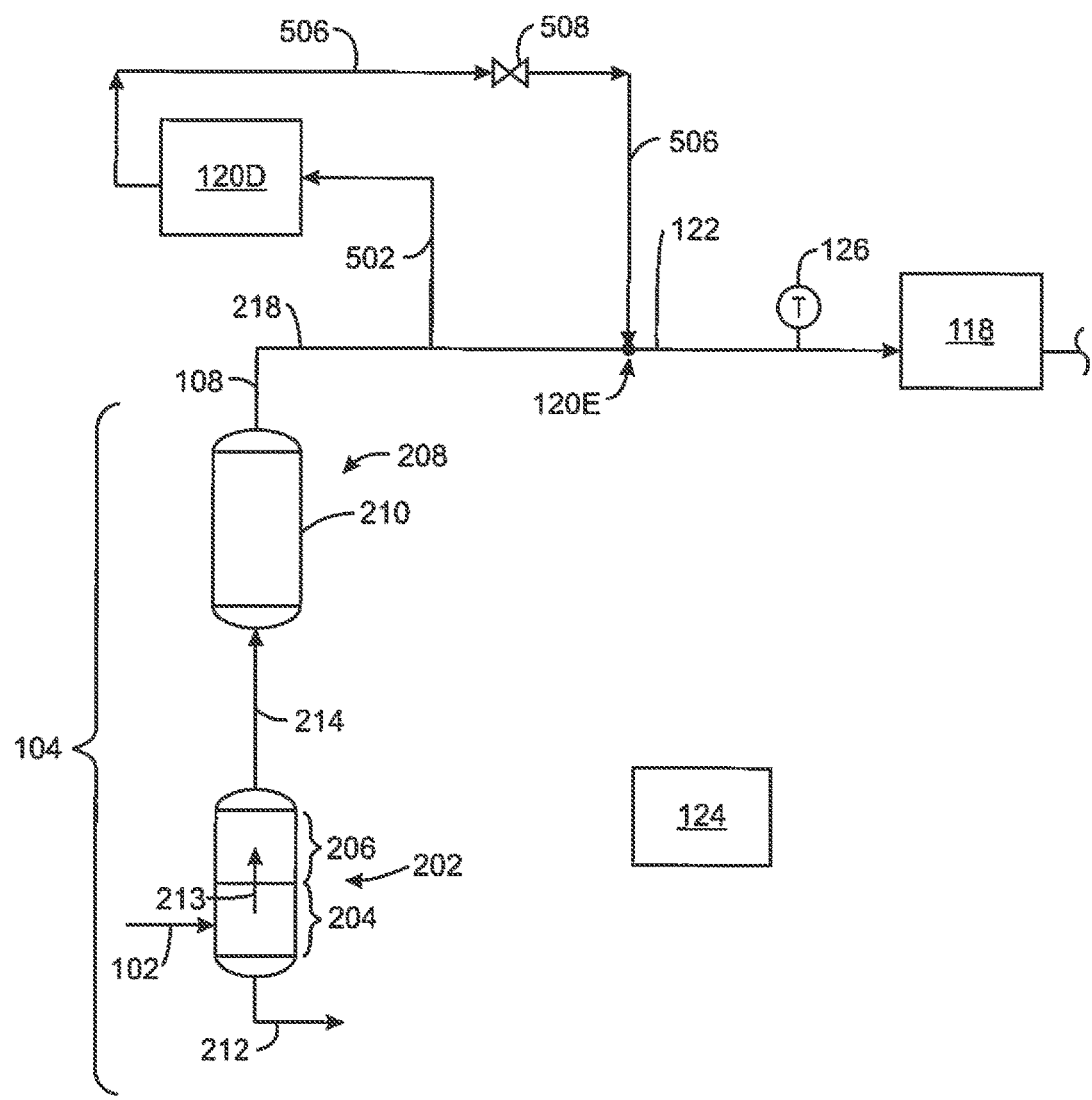
FIG. 5 is a simplified process flow diagram of a system employing a cryogenic distillation column to purify natural gas, where an overhead stream is heated using an external heater to reduce fouling during start-up operations.

FIG. 5 is a simplified process flow diagram of a system 100D employing a cryogenic distillation column to purify natural gas, where an overhead stream is heated using an external heater to prevent fouling during start-up operations. Like numbers are as described with respect to FIGS. 1 and 2. The system 100D of FIG. 5 diverts a portion 502 (or all) of the overhead stream 108 and heats the portion 502 in an external heat exchanger 120D to give a heated diverted portion 506.

As shown in FIG. 5, the external heat exchanger 120D may be located external to the flow line 218 that carries the overhead stream 108. In some embodiments, the external heat exchanger 120D may be located within the system 100D or at a location external to the system 100D. The heated diverted portion 506 may blend into the flow line 218 at a pipe tee 120E to form the heated overhead stream 122. In some embodiments, the external heat exchanger 120D may include a process heater, a utility heating fluid heater, a trim heater, or an electric heater.

The control system 124 may use the measured temperature provided by a temperature indicator 126 as an input value to adjust a control mechanism, such as the control valve 508, to regulate and maintain the temperature of the heated overhead stream 122 to a set-point temperature. In other embodiments, a control scheme of the control system 124 may use a real-time computation of a temperature and/or as the set-point temperature. In further embodiments, the control system 124 may control how much of the overhead stream 108 is diverted into stream 502 and heated in the external heat exchanger 120D.

In FIG. 5, the heated diverted portion 506, when blended with the overhead stream 108, may reduce or desirably prevent solidification of $CO_2$ in the overhead stream 108 generally and during a system disturbance, as previously described. The heated overhead stream 122 flowing into the heat exchanger 118 may provide a substantially low occurrence, and desirably no occurrence, of solid $CO_2$ accumulation on the heat exchanger 118 or other downstream process equipment. The system 100D may continue as described with respect to system 100 until normal operating conditions are reached.

Figure 6:
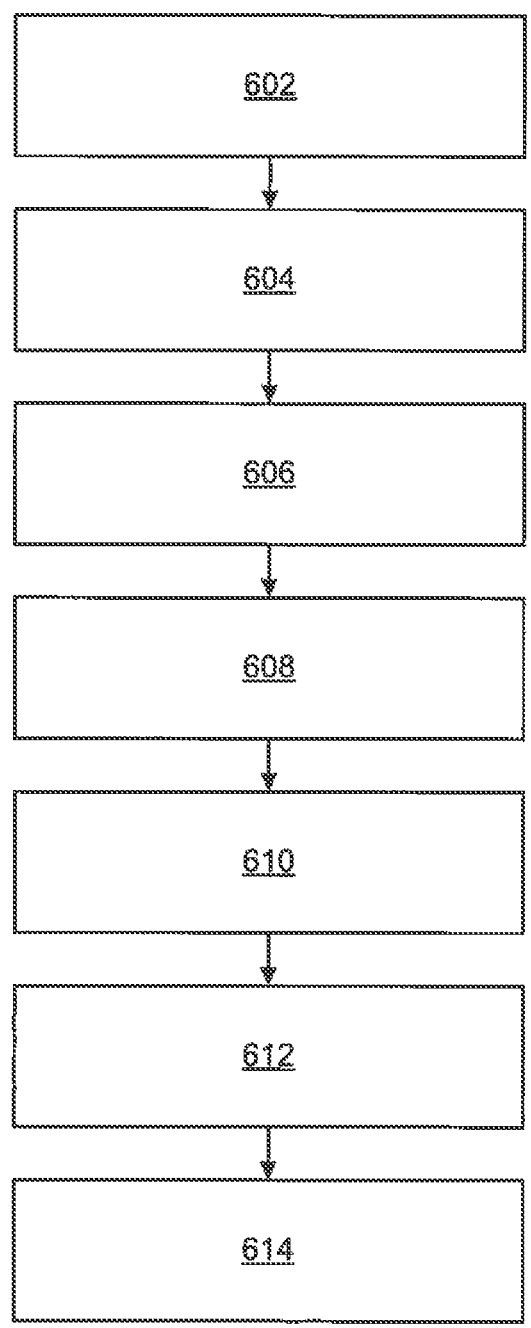
FIG. 6 is a block diagram of an exemplary method of heating an overhead stream during start-up operations of a cryogenic distillation column to reduce fouling.

FIG. 6 is a block diagram of an exemplary method 600 of heating an overhead stream during start-up operations of a cryogenic distillation column to prevent or reduce fouling. Instead of using solidification inhibitors or a relatively clean methane stream, embodiments may use an overhead stream during start-up to aid in the generation of clean reflux liquids during normal operations.

At block 602, the method 600 includes feeding a feed gas (e.g., dehydrated and/or chilled natural gas) that includes methane ($CH_4$) and at least one acid gas (e.g., $CO_2$) to a cryogenic distillation column during start-up (and normal operations) of the cryogenic distillation column. In one or more embodiments, the cryogenic distillation column may include a Controlled Freeze Zone™ (CFZ™) column. The column is configured to purify the feed gas by removing acid gases via the bottoms and discharging methane product overhead. At block 604, the method includes producing an acid gas rich bottom stream, and a freeze zone vapor stream that may be richer in the more volatile compound, $CH_4$. At block 606, the method includes flowing the freeze zone vapor stream upwards through a freezing section of the distillation column. The freezing section may be a Controlled Freeze Zone™. The freeze zone vapor stream may continue through the rectifying section of the distillation column to exit the cryogenic distillation column as an overhead stream.

At block 608, the method includes heating the overhead stream via a heating component to form a heated overhead stream to reduce or prevent solidification of $CO_2$ in the overhead stream. At block 610, the method includes flowing the heated overhead stream into a heat exchanger, wherein solidification of $CO_2$ is less than if the overhead stream had not been heated by the heating component. At block 612, the method includes compressing the heated overhead stream via a compressor to produce a high-pressure vapor, where the heated overhead stream is compressed to a pressure beyond solidification conditions for $CO_2$. Further, at block 614, the method includes reducing pressure of the high-pressure vapor to produce a liquid at an inlet of the cryogenic distillation column, where the liquid is introduced into the cryogenic distillation column (e.g., as a refluxing spray).

Figure 7:
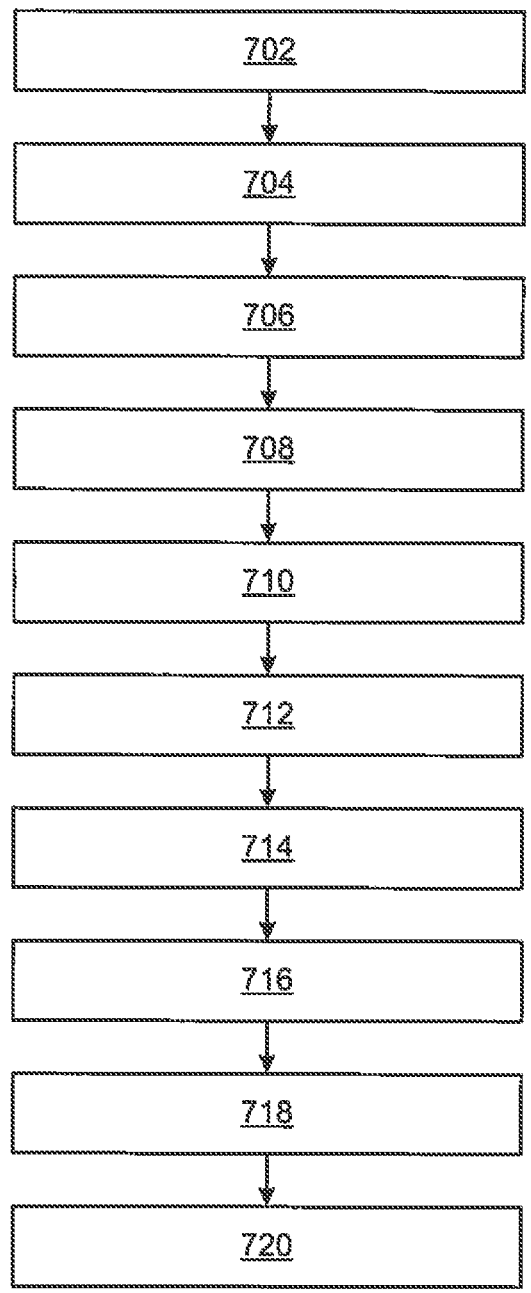
FIG. 7 is a block diagram of another exemplary method of heating an overhead stream during start-up operations of a cryogenic distillation column to reduce fouling.

FIG. 7 is a block diagram of another exemplary method 700 of heating an overhead stream during start-up operations of a cryogenic distillation column to reduce fouling. At block 702, the method 700 includes feeding a feed gas including at least one acid gas (for example, $CO_2$) and methane during start-up of a cryogenic distillation column. At block 704, the method 700 includes producing an acid gas rich bottom stream and a freeze zone vapor stream. At block 706, the method 700 includes flowing the freeze zone vapor stream into a freezing section of the cryogenic distillation column, where the freeze zone vapor stream exits the cryogenic distillation column as an overhead stream. At block 708, the method 700 includes heating the overhead stream via a heating component to form a heated overhead stream. At block 710, the method 700 includes flowing the heated overhead stream into a heat exchanger, wherein the solidification of $CO_2$ in the heat exchanger is substantially reduced or prevented due to the use of the heating component. At block 712, the method 700 includes compressing the heated overhead stream via a compressor to produce a high-pressure vapor, where the heated overhead stream is compressed to a pressure beyond solidification conditions for $CO_2$. At block 714, the method 700 includes reducing the pressure and temperature of the high-pressure vapor to produce a liquid-vapor stream. At block 716, the method 700 includes flowing the liquid-vapor stream into the cryogenic distillation column, where the liquid-vapor stream is introduced into the cryogenic distillation column to lower the concentration of $CO_2$ in the overhead stream. At block 718, the method 700 includes cycling the overhead stream in the cryogenic distillation column, where the cycling comprises a cooling cycle comprising compression, heat exchange, and reduction in pressure and temperature. Further, at block 720, the method 700 includes continuously recycling the overhead stream in the cryogenic distillation column until the concentration of $CO_2$ is lowered to a non-solidifying range at typical operating conditions.

Figure 8:
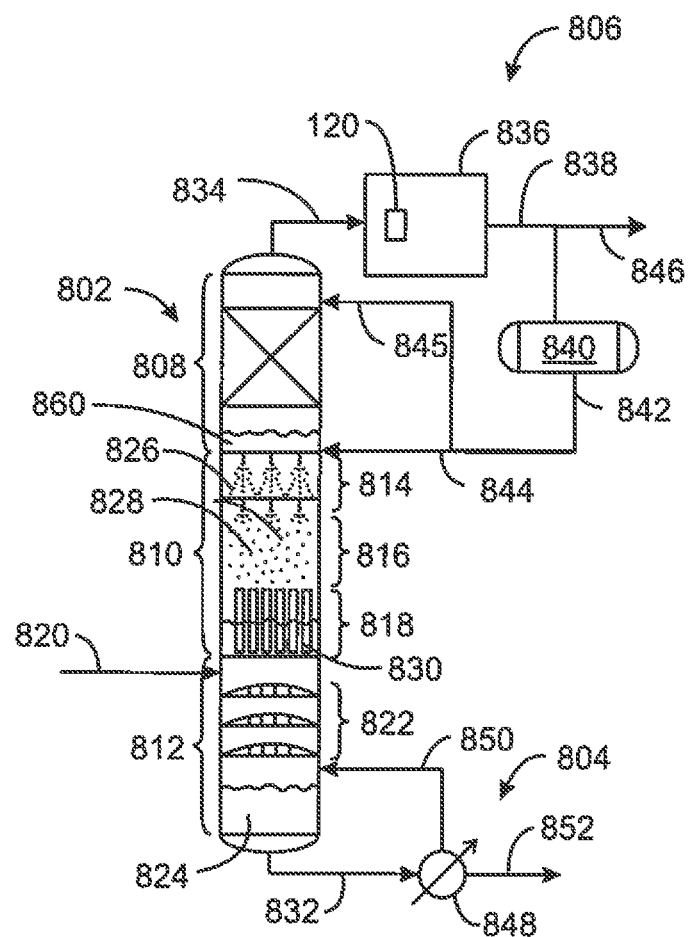
FIG. 8 is a drawing of a cryogenic distillation column system to receive a feed gas having a carbon dioxide content.

FIG. 8 is a drawing of a cryogenic distillation column system 800 to receive a feed gas comprising acid gases, such as carbon dioxide. An example of typical normal operations, e.g., after start-up, is discussed with respect to FIG. 8. The heating component 120, as described in FIG. 1, implemented to facilitate an unassisted start-up is depicted. After start-up, the heating component 120 may be "off" or "on" during normal operations. As shown in FIG. 8, the column system 800 may include a cryogenic distillation column 802, which may be a CFZ™ column, with an associated reboiler system 804 and an overhead system 806. The overhead system 806 includes an overhead exchanger and compressor system 836 and the heating component 120, in some examples. The cryogenic distillation column 802 may include three separate sections, such as an upper distillation section or "rectification section" 808, a middle distillation section or freezing section 810, and a lower distillation section or "stripping section" 812. The freezing section 810 may be related to the Controlled Freeze Zone™ (CFZ™) technology or may be implemented outside of the CFZ™ technology. The freezing section 810 may include a spray nozzle bank 814, a vapor zone 816, and a melt tray 818.

A chilled two-phase fluid 820, e.g., liquid/vapor phase fluid, may be introduced into the stripping section 812 where the two-phase fluid 820 may include a $CO_2$ concentration and a $CH_4$ concentration, among other heavier hydrocarbons and contaminants. Within the stripping section 812, the two-phase fluid 820 may be separated into a liquid and a vapor.

The liquid of the two-phase fluid 820 may collect on the series of trays 822 and flow into a bottom portion of the stripping section 812 to form a liquid pool 824. The liquid in the liquid pool 824 may primarily include liquid $CO_2$ and dissolved $H_2S$, if present. The vapor of the two-phase fluid 820 may leave the stripping section 812 and proceed upward into risers in the melt tray 818. As the vapor continues upward, it may enter the vapor zone 816. The risers of the melt tray 818 may act as a vapor distributor for uniform distribution through the vapor zone 816. As the vapor continues to rise upward into the vapor zone 816, the vapor may contact a spray of cold liquid 826 emitted by the spray nozzle bank 814. When in contact with the spray of cold liquid 826, a portion of the $CO_2$ in the vapor may solidify within the vapor zone 816. This may act to remove or "freeze out" the $CO_2$ contaminant within the vapor. The solidified $CO_2$ 828 may fall onto the melt tray 818 where it may be heated to form liquid $CO_2$ 830 that may be collected on the melt tray 818. The liquid $CO_2$ 830 may then flow into the stripping section 812 and into the liquid pool 824, which primarily includes liquid $CO_2$. The liquid $CO_2$ 824/830 may exit the stripping section 812 as a sour liquid 832.

With contaminants removed, the vapor may continue to flow upward and into the rectification section 808, along with other light gases. The vapor may include a sweet gas 834, such as methane, $CH_4$, that may exit overhead of the cryogenic distillation column 802. The sweet gas 834 may be cooled in the overhead system 806 to form a condensed or partially-condensed stream 838. An overhead product stream 846 may be split from stream 838 and may be removed from the column system 800 as an end-product.

The remainder of the condensed or partially-condensed stream 838 may enter a reflux accumulator 840 where a reflux stream, e.g., liquid condensate 842, may be collected and recycled back into the cryogenic distillation column 802. The liquid condensate 842 may split into separate streams: a stream 845, which may re-enter the column 802 as a reflux stream and a small slipstream 844, which may re-enter the column 802 as part of the spray of cold liquid 826. The liquid that falls to the bottom of the rectification section 808 may accumulate as a liquid pool 860 at the bottom of the rectification section, and while not shown in FIG. 8, the collected liquid 860 may exit the distillation tower and serve as a source of liquid for the spray 814 in the cryogenic distillation column.

A portion of the sour liquid 832 exiting the stripping section 812 may be heated in a reboiler 848 and returned to the stripping section 812 as a reboiler stream 850. The reboiler stream 850 may provide energy to the bottom of the cryogenic distillation column 802 to boil off methane and other light components that may be dissolved in the sour liquid 832. A residual reboiled liquid, e.g., a bottoms product 852, may exit the reboiler 848.

In summary, during start-up operations for a cryogenic distillation column, a system disturbance of an overhead stream may increase the concentration and temperature of its contaminants, such as $CO_2$. For example, a warming disturbance may cause the $CO_2$ concentration to rise relative to the temperature of an overhead stream, where the temperature was previously in equilibrium with a lower $CO_2$ concentration. Consequently, as the overhead stream flows into downstream equipment, e.g., a heat exchanger, the potential for $CO_2$ solid formation when in contact with the cold metal of the heat exchanger may increase and thus, lead to fouling of the equipment.

The methods and system of the present examples may describe reducing or removing the occurrence of $CO_2$ solid formation outside of the cryogenic distillation column during a system disturbance by flowing a heated overhead stream into the downstream process equipment during start-up operations. The start-up operations may also include a cooling cycle to provide continued recycling of the overhead stream. A liquid generated in the cooling cycle may act as a liquid spray within a freezing zone of the cryogenic distillation column to separate the $CO_2$ contaminant using solidifying techniques. The cooling cycle may continue until the $CO_2$ concentration is lowered to a normal, non-solidifying range of about 2 mole % to about 6 mole %. At that time, the overhead stream may be expanded and redirected to a reflux accumulator to start reflux generation used during normal operations.

While the present techniques may be susceptible to various modifications and alternative forms, the examples discussed above have been shown only by way of example. However, it should again be understood that the techniques are not intended to be limited to the particular examples disclosed herein. Indeed, the present techniques include all alternatives, modifications, and equivalents falling within the true spirit and scope of the appended claims.

What is claimed is:

1. A method comprising:
    feeding a feed gas comprising methane (CH4) and carbon dioxide (CO2) to a cryogenic distillation column during start-up of the cryogenic distillation column;
    producing an acid gas rich bottom stream and a freeze zone vapor stream;
    flowing the freeze zone vapor stream into a freezing section of the cryogenic distillation column, wherein the freeze zone vapor stream exits the cryogenic distillation column as an overhead stream, and wherein the overhead stream has a temperature and a CO2 concentration;
    heating the overhead stream via a heating component to form a heated overhead stream to reduce or prevent solidification of the CO2 in the overhead stream;
    regulating an amount of heat emitted by the heating component via a control system, wherein the control system maintains a temperature margin of the heated overhead stream using a measured temperature as an input into a control scheme, wherein the temperature margin is a temperature difference between the temperature of the overhead stream and a temperature at which CO2 solidification would occur in the overhead stream given the CO2 concentration of the overhead stream; and
    flowing the heated overhead stream into a heat exchanger, wherein the heated overhead stream substantially prevents solidification of CO2 in the heat exchanger.

2. The method of claim 1, wherein the heating of the overhead stream comprises raising a temperature of the overhead stream by 0.5° F. to 10° F.

3. The method of claim 1, comprising measuring a temperature of the heated overhead stream at an inlet of the heat exchanger.

4. The method of claim 1, comprising recycling the overhead stream back to the cryogenic distillation column, wherein the overhead stream enters a cooling cycle comprising compression, heat exchange, and reduction in pressure and temperature in the recycle.

5. The method of claim 1, comprising recycling the overhead stream back to the cryogenic distillation column until a concentration of the CO2 is lowered to a non-solidifying range.

6. The method of claim 1, comprising diverting the overhead stream to a reflux accumulator after a non-solidifying range for the CO2 is reached.

7. The method of claim 1, wherein heating the overhead stream via the heating component comprises disposing an inline heater in a flow line of the overhead stream, wherein the inline heater is disposed upstream of the heat exchanger.

8. The method of claim 1, wherein heating the overhead stream via the heating component comprises disposing heat tracing on a flow line of the overhead stream, wherein heating tracing is disposed upstream of the heat exchanger.

9. The method of claim 1, wherein heating the overhead stream via the heating component comprises diverting a portion of the overhead stream to an external heat exchanger to form a heated diverted portion and blending the heated diverted portion into the overhead stream.

10. A method comprising:
    feeding a feed gas comprising carbon dioxide (CO2) and methane (CH4) into a cryogenic distillation column during start-up;
    producing an acid gas rich bottom stream and a freeze zone vapor stream in the cryogenic distillation column;
    flowing the freeze zone vapor stream into a freezing section of the cryogenic distillation column, wherein the freeze zone vapor stream exits the cryogenic distillation column as an overhead stream, and wherein the overhead stream has a temperature and a CO2 concentration;
    heating the overhead stream via a heating component to form a heated overhead stream;
    regulating an amount of heat emitted by the heating component via a control system, wherein the control system uses a measured temperature as an input into a control scheme to maintain a temperature margin of the heated overhead stream, wherein the temperature margin is a temperature difference between the temperature of the overhead stream and a temperature at which $CO_2$ solidification would occur in the overhead stream given the $CO_2$ concentration of the overhead stream;

flowing the heated overhead stream into a heat exchanger, wherein solidification of the $CO_2$ in the heat exchanger is substantially reduced or prevented;

compressing the heated overhead stream via an overhead compressor to produce a high-pressure vapor, wherein the heated overhead stream is compressed to a pressure beyond solidification conditions for $CO_2$;

reducing pressure and temperature of the high-pressure vapor via a Joule-Thomson (J-T) valve to produce a liquid-vapor stream;

flowing the liquid-vapor stream into the cryogenic distillation column, wherein the liquid-vapor stream is introduced into the cryogenic distillation column to lower a concentration of the $CO_2$ in the overhead stream;

cycling the liquid-vapor stream back to the cryogenic distillation column, wherein the cycling comprises a cooling cycle comprising compression, heat exchange, and reduction in pressure and temperature; and continuously recycling the liquid-vapor stream back to the cryogenic distillation column until a concentration of the $CO_2$ in the liquid-vapor stream is lowered to a non-solidifying range.

* * * * *